2,898,529

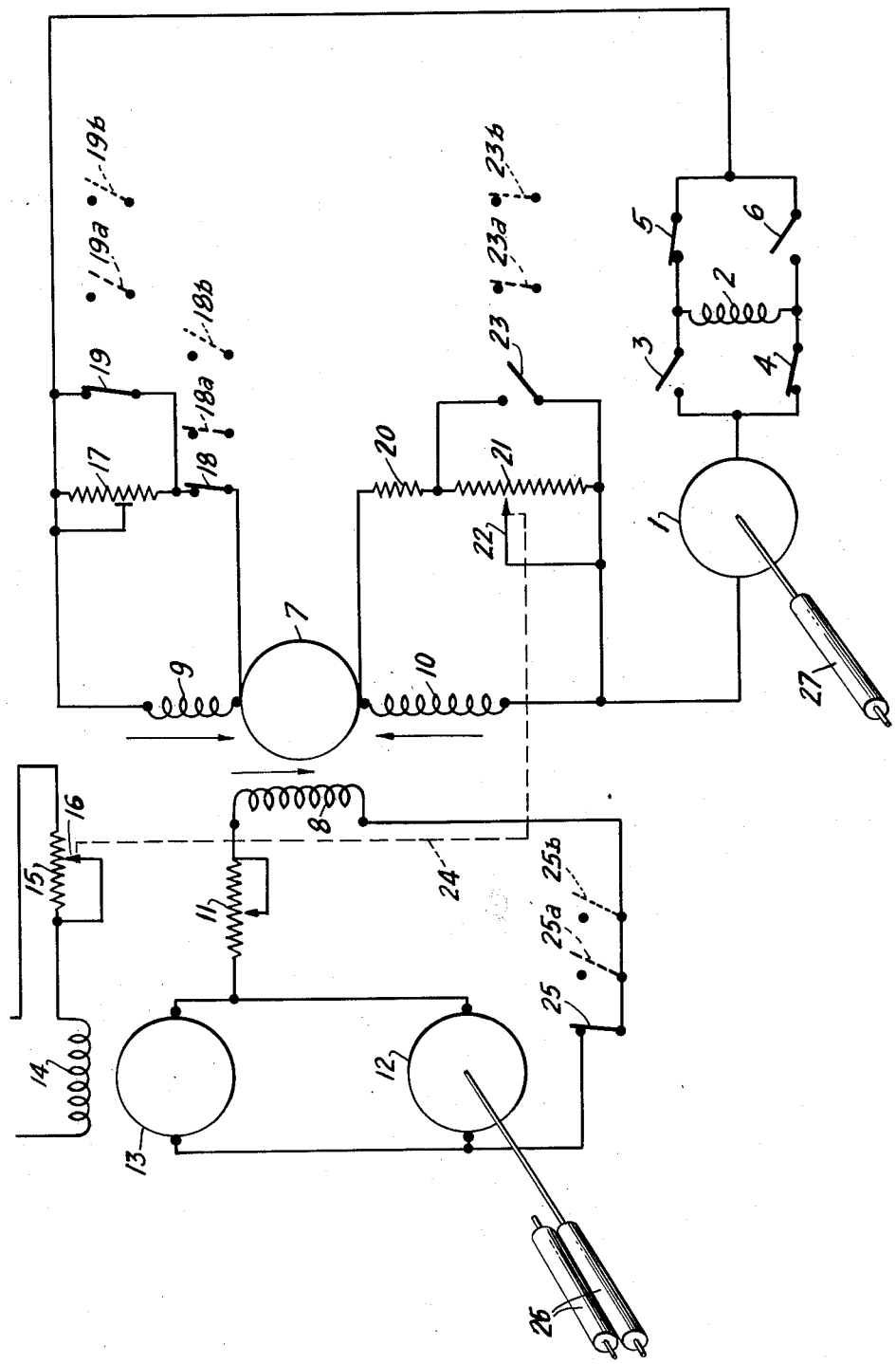

INSTALLATIONS PARTICULARLY FOR THE WINDING UP OF A SHEET OF TEXTILE THREADS

Albert Louis Gabriel Pelletier, Epinal, France, assignor to Comptoir de l'Industrie Cotonniere, Etablissements Boussac, Paris, France, a French company Application June 25, 1956, Serial No. 593,439

Claims priority, application France February 7, 1956

6 Claims. (Cl. 318—7)

The present invention relates to improvements in installations for winding up of a sheet of textile threads travelling continuously from a treatment machine under the following conditions:

(a) The sheet of threads to be wound up may have a linear speed that may vary within large limits, for example between ten and sixty metres per minute.

(b) The speed of operation should be able to be reduced to a low value relatively to the normal speed, for example to two metres per minute instead of the normal speed already mentioned.

(c) During winding-up the diameter of the wound roll varies within wide limits, for example in the range of 1–6.

(d) The tension on the sheet of threads should be able to be automatically maintained constant during the winding-up operation regardless of the linear speed of the sheet and the diameter of the wound up roll.

(e) The value of this constant tension should be able to be regulated at the beginning of each operation, within wide limits according to the articles worked, for example between twenty and one hundred and twenty kilogrammes.

(f) The tension on the sheet of threads should be able to be maintained during stoppages but should also be able to be relaxed.

(g) Backward movement of the wound up roll at low speeds for feeding off should be possible when the supplying machine is at rest.

To carry the above conditions into effect the installation according to the invention comprises, in combination, a direct current motor with series connected field windings, a dynamo for feeding the motor and having three independent field windings, that is to say, a separately fed winding, a first series connected winding, a second series connected winding and combining means, enabling the fluxes created by the three windings being varied individually, on the one hand, and of combining these fluxes between them on the other hand.

According to another characteristic of the invention, the separately fed winding is energized by the voltage across the terminals of the driving motor for the machine preceding the winding machine.

According to another characteristic of the invention, the separately fed winding and the first series connected winding create magnetic fluxes of the same sense, whilst the second series connected winding creates a flux in opposition to those of the other two windings.

According to another characteristic of the invention, the regulating means associated with the second series connected winding are coupled to the regulating means associated with the field magnet windings of the dynamo supplying current to the driving motor of the machine preceding the winding machine.

According to another characteristic of the invention, the number of turns in the second series connected winding is greater than those of the first series connected winding.

Other characteristics and advantages of the invention will be evident from the following description: reference being made to the annexed drawing, in which the single figure is a diagram of an installation according to the invention.

On this drawing, 1 is the armature of the motor driving the winding machine and 2 indicates the series connected field magnet winding thereof that can be supplied with electrical current in one direction or the other, to change the direction of rotation of the motor, by means of the switches 3, 4, 5, 6.

The motor 1, 2 is supplied with electric current by a dynamo having an armature 7 and three independent field magnet windings 8, 9, 10.

The winding 8 is separately supplied with an electrical current through the adjustable resistance 11 fed with the voltage appearing across the terminals of the motor 12 driving the machine preceding the winding machine already referred to. This motor 12 is supplied with electrical current generated by the dynamo 13 the field magnet winding 14 of which is energized through the adjustable resistance 15 having a slider 16.

The two other field magnet windings 9 and 10 are connected in series and so dimensioned that the number of turns in the winding 10 is greater than that in the winding 9. The windings 9 and 10 generate flux in opposition with each other and winding 9 generates flux in the same direction as winding 8. The first series connected winding 9 is associated with regulating and combining means in the form of the adjustable resistance 17 that can be connected in parallel with the winding 9 by means of the switch 18 and that can be short-circuited by the switch 19.

The second series connected winding 10 also cooperates with regulating and combining means in the form of the fixed resistance 20 series connected to the adjustable resistance 21 having the slider 22 and having the switch 23 adapted to short-circuit the resistance 21 as required, the assembly 20, 21 being connected in parallel with the winding 10.

The sliders 16 and 22 are mechanically coupled by means diagrammatically shown on the drawing by the dotted line 24.

The supply of current to the separately energized winding 8 can be interrupted by the switch 25 when required.

The installation described above operates as follows:

For normal running the switches 18, 19, 23 and 25 occupy the positions indicated by the unbroken lines. The voltage of the dynamo 7 is then essentially determined by the separately energized winding 8. Further the winding 9 is short-circuited by the switches 18 and 19 and the winding 10 is shunted by the resistances 20 and 21.

Since the voltage fed to the winding 8 is also fed to the motor 12 driving supply rolls 26 of the machine preceding the winding machine, having the take up roll or reel 27, and the speed of this motor is substantially proportional to the supply voltage, the output voltage of the dynamo 7 is substantially proportional to the speed of the motor 12.

Further, since the flux created by the winding 10 is in opposition to the flux created by the winding 8 and that it depends on the current absorbed by the motor 1, the voltage of the dynamo 7 is automatically reduced when the torque required by the motor 1 is increased due to the increase in diameter of the take-up roll or reel 29 on the winding-up or reeling machine as the textile material is delivered from rolls 26 to take-up roll 29. This in combination with the characteristics of the series connected motor 1—2, ensures the winding-up of the sheet of threads, not shown, with a constant tension, for a given linear speed of the sheet.

When the speed of operation of the machine preceding the winding-up machine is to be modified this is effected by a displacement of the slider 16 of the adjustable resistance 15 in the excitation circuit of the generator 13 feeding the motor 12, the constancy of the tension in the sheet of threads being ensured due to the coupling between the sliders 16 and 22 with the result that any displacement of the slider 16 causes a similar displacement of the slider 22 and thus a modification of the effect of the winding 10.

When a low speed, outside the normal operational limits, is required, the switch 23 is closed as shown at 23a, so that only the resistance 20 remains connected in parallel with the winding 10. The resistance 11 in series with the winding 8 is adjusted once for all in such a way that this coil produces the necessary flux when the voltage required for a slow speed of the preceding machine is applied to the motor 12.

To maintain a constant voltage when at rest the switches 18, 19, 23 and 25 are moved to the positions 18a, 19a, 23a and 25a respectively as shown by dashed lines.

The field magnet winding 8 is then completely disconnected and the voltage from the dynamo 7 is essentially determined by the field magnet winding 9 shunted by the resistance 17 adjusted to have a required value. Further, the inverse flux created by the winding 10 is very much less than the flux produced by the winding 9 due to the short-circuiting of the resistance 21 and to the value of the resistance 20.

The regulation of the tension of the sheet of threads is effected by adjustment of the variable resistance 11 that causes variations in the relative values of the direct and indirect fluxes respectively created by the windings 8 and 10, whilst the coil 9 is short-circuited.

This regulation moreover is useful for normal speeds of operation as well as for slow speeds outside the normal operational limits.

To operate the winding-up machine backwardly at low speed, the switches 18, 19, 23 and 25 are moved to the positions 18b, 19b, 23b and 25b, indicated by dotted lines. The first series connected winding 9 then has its maximum effect because the whole of the output current from the dynamo 7 passes therethrough whilst the flux created by the second series connected winding 10 is rather feeble because this winding is shunted by the relatively small resistance 20.

At the same time the direction of rotation of the motor 1—2 is reversed by the opening of the switches 3 and 6 and the closing of the switches 4 and 5.

It will be evident that the method of carrying the invention into effect as described above and as shown on the drawing is only given as a simple non-limitative example and that the form, nature, arrangement and assembly of the parts can be varied without departing from the scope of the invention. Thus the switches can be operated by any automatic means ensuring the mutual interaction necessary to give the desired control.

What I claim is:

1. In a control system for maintaining a constant tension on flexible material delivered from a delivery apparatus and wound on a reeling device, in combination, a reversible direct current series first motor connected in driving relation with a reeling device, a first generator connected to supply electrical energy to said first motor and having a plurality of separate and independent field windings comprising two windings separately connected to respond to armature current of the first motor and operatively connected to generate flux in opposition to each other with one of said two windings having a larger number of turns than the other and a separately excited third winding connected to generate flux in opposition to the winding having the larger number of turns, a second direct current motor connected in driving relation with the delivery apparatus for delivering said material to the reeling device, a separately excited second generator connected to supply electrical energy to the second motor and an excitation voltage to said third winding in proportion to the voltage supplied to the second motor, whereby the output voltage of the first generator is substantially proportional to the speed of the second motor and said output voltage is automatically reduced as a function of the torque output of the first motor thereby maintaining the tension substantially constant on said flexible material.

2. In a control system according to claim 1, in which said second generator comprises separately excited means for establishing a separately excited excitation field, and which the system includes first impedance means for selectively and adjustably varying excitation current supplied to said excitation field means, second impedance means connected for adjustably and selectively varying excitation current in said winding having the larger number of turns, means operatively connected with both of said impedance means for selectively varying the impedance of each of said impedances simultaneously and in a given relationship thereby to maintain the tension constant on said material when the speed of the second motor is varied by adjustably varying the excitation field of the second generator.

3. In a control system according to claim 1, in which the second generator comprises means for establishing a separately excited field for the second generator, and in which means are provided for adjustably varying in a given relationship the flux intensity of said separately excited field and the flux intensity of a field established by said winding having the larger number of turns thereby to maintain the tension constant on said material when the speed of the second motor is varied by adjustably varying the excitation field of the second generator.

4. In a control system for maintaining a constant tension on flexible material delivered from a delivery apparatus and wound on a reeling device, in combination, a reversible direct current series motor connected in driving relation with a reeling device, a generator connected to supply electrical energy to said motor and having a plurality of separate and independent field windings comprising two windings separately connected to respond to armature current and operatively connected to generate flux in opposition to each other with one of said two windings having a larger number of turns than the other and a separately excited third winding connected to generate flux in opposition to the series winding having the larger number of turns, means including excitation means operably associated with the delivery apparatus delivering said material to the reeling device for separately exciting said third winding with an excitation voltage substantially proportional to the delivery speed of the delivery means and the output voltage of said generator is substantially proportional to the speed of the delivery apparatus and said output voltage is automatically reduced as a function of the torque output of the first motor thereby maintaining the tension substantially constant on said flexible material.

5. In a control system according to claim 4, including means for selectively separately varying the excitation current in each of said two windings independently of the armature current of said motor.

6. In a control system for maintaining a constant tension on flexible material delivered from a delivery apparatus and wound on a reeling device, in combination, a reversible direct current series first motor connected in driving relation with a reeling device, a first generator connected to supply electrical energy to said first motor and having a plurality of separate and independent field windings comprising two windings separately connected to respond to the armature current of the first motor and operatively connected to generate flux in opposition to each other with one of said two windings having a larger number of turns than the other and a separately excited third winding connected to generate flux in opposition to the series winding having the larger number of turns, a second direct current motor connected in driving relation with the delivery apparatus for delivering said material to the reeling device, a separately excited second generator connected to supply electrical energy to the second motor and an excitation voltage to said third winding in proportion to the voltage supplied to the second motor, and impedance means connected for separately selectively varying the excitation current in each of said two windings independently of the armature current of said first motor, whereby the output voltage of the first generator is substantially proportional to the speed of the second motor and said output voltage is automatically reduced as a function of the torque output of the first motor thereby maintaining the tension substantially constant on said flexible material.

References Cited in the file of this patent

UNITED STATES PATENTS

| | | |
|---|---|---|
| 2,305,937 | Montgomery et al. | Dec. 22, 1942 |
| 2,665,401 | Pell | Jan. 5, 1954 |
| 2,684,458 | Winchester | July 20, 1954 |